US010191798B2

(12) United States Patent
Asterjadhi

(10) Patent No.: US 10,191,798 B2
(45) Date of Patent: Jan. 29, 2019

(54) EXTENDED INTERFRAME SPACE (EIFS) EXEMPTIONS

(71) Applicant: QUALCOMM Incorporated, San Diego, CA (US)

(72) Inventor: Alfred Asterjadhi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 77 days.

(21) Appl. No.: 15/146,303

(22) Filed: May 4, 2016

(65) Prior Publication Data

US 2016/0335147 A1    Nov. 17, 2016

Related U.S. Application Data

(60) Provisional application No. 62/159,917, filed on May 11, 2015.

(51) Int. Cl.
| | | |
|---|---|---|
| *G06F 11/00* | (2006.01) | |
| *G06F 11/07* | (2006.01) | |
| *H04W 74/08* | (2009.01) | |
| *H04B 7/0413* | (2017.01) | |
| *H04W 84/12* | (2009.01) | |

(52) U.S. Cl.
CPC ........ *G06F 11/079* (2013.01); *G06F 11/0709* (2013.01); *G06F 11/0751* (2013.01); *H04B 7/0413* (2013.01); *H04W 74/08* (2013.01); *H04W 84/12* (2013.01)

(58) Field of Classification Search
CPC ............... G06F 11/079; G06F 11/0709; G06F 11/0751; H04B 7/0413; H04W 74/08; H04W 84/12
See application file for complete search history.

(56) References Cited

U.S. PATENT DOCUMENTS

| | | |
|---|---|---|
| 7,231,530 B1 | 6/2007 | Miller et al. |
| 2004/0010736 A1* | 1/2004 | Alapuranen .......... H04L 1/1628 |
| | | 714/100 |

(Continued)

OTHER PUBLICATIONS

Asterjadhi A., et al., "ACK Indication and EIFS", May 13, 2013 (May 13, 2013), XP055174925, pp. 1-15, Retrieved from the Internet: URL: https://mentor.ieee.org/802.11/dcn/13/11-13-0512-00-00ah-ack-indication-and-eifs.pptx [retrieved on May 9, 2015] the whole document.

(Continued)

*Primary Examiner* — Jason B Bryan
(74) *Attorney, Agent, or Firm* — Patterson & Sheridan, L.L.P.

(57) ABSTRACT

Certain aspects of the present disclosure relate to selecting a deferral period after detecting an error in a received packet by an apparatus for wireless communications. The apparatus generally includes an interface configured to obtain a frame received over a medium, and a processing system configured to detect an occurrence of an error when processing the frame, determine an intended recipient of the frame based on information included in the frame, and select a deferral period, after detecting the occurrence of the error, during which the apparatus refrains from transmitting on the medium, wherein the selection is based, at least in part, on the determination.

30 Claims, 7 Drawing Sheets

(56) References Cited

U.S. PATENT DOCUMENTS

| | | | |
|---|---|---|---|
| 2007/0064701 A1* | 3/2007 | Lin .................. | H04W 52/0238 |
| | | | 370/392 |
| 2007/0171933 A1 | 7/2007 | Sammour et al. | |
| 2007/0201419 A1* | 8/2007 | Miller ............... | H04W 52/0225 |
| | | | 370/338 |
| 2009/0103485 A1 | 4/2009 | Singh et al. | |
| 2014/0348148 A1* | 11/2014 | You ...................... | H04W 56/00 |
| | | | 370/338 |
| 2015/0110093 A1 | 4/2015 | Asterjadhi et al. | |

OTHER PUBLICATIONS

International Search Report and Written Opinion—PCT/US2016/030937—ISA/EPO—Aug. 2, 2016.

* cited by examiner

S1G PPDU 1MHz format

EXTENDED INTERFRAME SPACE (EIFS) EXEMPTIONS

CLAIM OF PRIORITY UNDER 35 U.S.C. § 119

The present application for patent claims benefit of U.S. Provisional Patent Application Ser. No. 62/159,917, filed May 11, 2015 and assigned to the assignee hereof and hereby expressly incorporated by reference herein.

BACKGROUND

Field of the Disclosure

Certain aspects of the present disclosure generally relate to wireless communications and, more particularly, to exemptions to extended interframe space (EIFS) deferral.

Description of Related Art

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

In order to address the issue of increasing bandwidth requirements that are demanded for wireless communications systems, different schemes are being developed to allow multiple user terminals to communicate with a single access point by sharing the channel resources while achieving high data throughputs. Multiple Input Multiple Output (MIMO) technology represents one such approach that has emerged as a popular technique for communication systems. MIMO technology has been adopted in several wireless communications standards such as the Institute of Electrical and Electronics Engineers (IEEE) 802.11 standard. The IEEE 802.11 denotes a set of Wireless Local Area Network (WLAN) air interface standards developed by the IEEE 802.11 committee for short-range communications (e.g., tens of meters to a few hundred meters).

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications in a wireless network.

Aspects of the present disclosure generally relate to a set of rules for selecting a deferral period when an error is detected in a received packet.

Certain aspects of the present disclosure provide an apparatus for wireless communications. The apparatus typically includes an interface for obtaining a frame received over a medium and a processing system configured to detect an occurrence of an error when processing the frame, determine an intended recipient of the frame based on information included in the frame, and select a deferral period, after detecting the occurrence of the error, during which the apparatus refrains from transmitting on the medium, wherein the selection is based, at least in part, on the determination.

Certain aspects of the present disclosure provide an apparatus for wireless communications. The apparatus typically includes a processing system configured to generate a frame for transmission, the frame having an indication of whether an intended recipient of the frame should select a first or second deferral period after detecting an error when processing the frame and an interface for outputting the frame for transmission.

Certain aspects of the present disclosure provide a computer readable medium having instructions stored thereon for obtaining a frame received over a medium by an apparatus, detecting an occurrence of an error when processing the frame, determining an intended recipient of the frame based on information included in the frame, and selecting a deferral period, after detecting the occurrence of the error, during which the apparatus refrains from transmitting on the medium, wherein the selection is based, at least in part, on the determination.

Certain aspects of the present disclosure provide a method for wireless communications. The method generally includes generating a frame for transmission, the frame having an indication of whether an intended recipient of the frame should select a first or second deferral period after detecting an error when processing the frame and outputting the frame for transmission.

Certain aspects of the present disclosure provide a method for wireless communications. The method generally includes obtaining a frame received over a medium by an apparatus, detecting an occurrence of an error when processing the frame, determining an intended recipient of the frame based on information included in the frame, and selecting a deferral period, after detecting the occurrence of the error, during which the apparatus refrains from transmitting on the medium, wherein the selection is based, at least in part, on the determination.

Certain aspects of the present disclosure provide an apparatus for wireless communications. The apparatus generally includes means for generating a frame for transmission, the frame having an indication of whether an intended recipient of the frame should select a first or second deferral period after detecting an error when processing the frame and means for outputting the frame for transmission.

Certain aspects of the present disclosure provide an apparatus for wireless communications. The apparatus generally includes means for obtaining a frame received over a medium by an apparatus, means for detecting an occurrence of an error when processing the frame, means for determining an intended recipient of the frame based on information included in the frame, and means for selecting a deferral period, after detecting the occurrence of the error, during which the apparatus refrains from transmitting on the medium, wherein the selection is based, at least in part, on the determination.

Certain aspects of the present disclosure provide a computer readable medium having instructions stored thereon for generating a frame for transmission, the frame having an indication of whether an intended recipient of the frame should select a first or second deferral period after detecting an error when processing the frame and outputting the frame for transmission.

Certain aspects of the present disclosure provide a computer readable medium having instructions stored thereon for obtaining a frame received over a medium by an apparatus, detecting an occurrence of an error when processing the frame, determining an intended recipient of the frame based on information included in the frame, and selecting a deferral period, after detecting the occurrence of the error, during which the apparatus refrains from transmitting on the medium, wherein the selection is based, at least in part, on the determination.

Certain aspects of the present disclosure provide a computer readable medium having instructions stored thereon for generating a frame for transmission, the frame having an indication of whether an intended recipient of the frame should select a first or second deferral period after detecting an error when processing the frame and outputting the frame for transmission.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
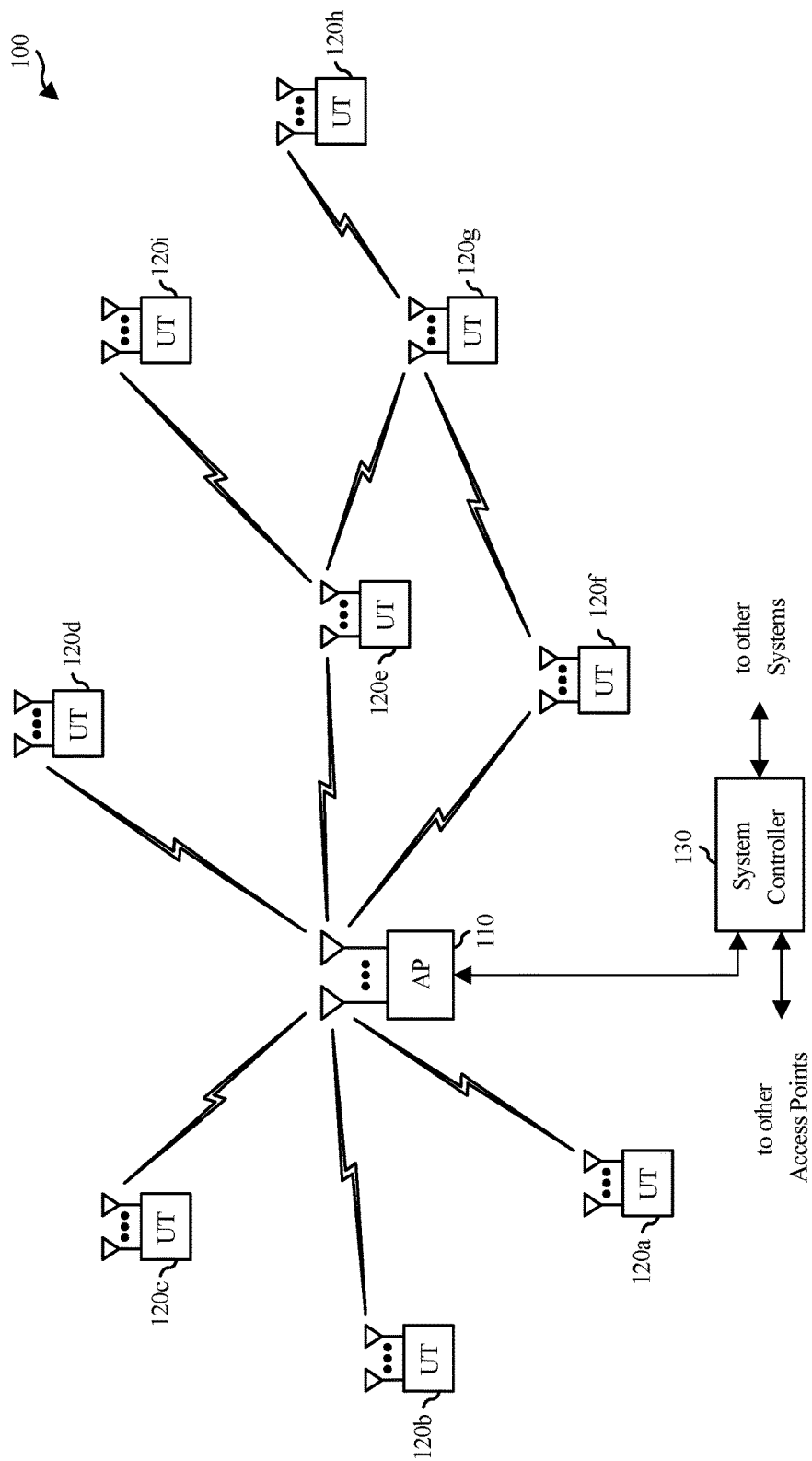
FIG. 1 illustrates an example wireless communications network, in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Aspects of the present disclosure generally relate to techniques for selecting deferral periods that may allow an intended recipient to select a short deferral period than if it were not the intended recipient. The techniques may be considered as defining a set of rules for EIFS exemptions.

As will be described in more detail herein, an apparatus may obtain a frame received over a medium, detect an occurrence of an error when processing the frame, determine that the apparatus is an intended recipient of the frame based on information included in the frame, and select a deferral period, after detecting the error, during which the apparatus refrains from transmitting on the medium based, at least in part, on the determination.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The techniques described herein may be used for various broadband wireless communication systems, including communication systems that are based on an orthogonal multiplexing scheme. Examples of such communication systems include Spatial Division Multiple Access (SDMA) system, Time Division Multiple Access (TDMA) system, Orthogonal Frequency Division Multiple Access (OFDMA) system, and Single-Carrier Frequency Division Multiple Access (SC-FDMA) system. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, Radio Network Controller ("RNC"), evolved Node B (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as a subscriber station, a subscriber unit, a mobile station (MS), a remote station, a remote terminal, a user terminal (UT), a user agent, a user device, user equipment (UE), a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a tablet, a portable communication device, a portable computing device (e.g., a personal data assistant), an entertainment device (e.g., a music or video device, or a satellite radio), a global positioning system (GPS) device, or any other suitable device that is configured to communicate via a wireless or wired medium. In some aspects, the AT may be a wireless node. Such wireless node may provide, for example, connectivity for or to a network (e.g., a wide area network such as the Internet or a cellular network) via a wired or wireless communication link.

An Example Wireless Communication System

FIG. 1 illustrates a system 100 in which aspects of the disclosure may be performed. For example, the access point 110 may send user terminals 120 a frame. User terminals 120 may receive the frame and detect errors when processing the frame. In another example, the user terminals 120 may send the access point 110 frames, which the access point 110 receives and detects errors when processing the frame.

The system 100 may be, for example, a multiple-access multiple-input multiple-output (MIMO) system 100 with access points and user terminals. For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device, or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal.

A system controller 130 may provide coordination and control for these APs and/or other systems. The APs may be managed by the system controller 130, for example, which may handle adjustments to radio frequency power, channels, authentication, and security. The system controller 130 may communicate with the APs via a backhaul. The APs may also communicate with one another, e.g., directly or indirectly via a wireless or wireline backhaul.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an AP 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminal 120.

Figure 2:
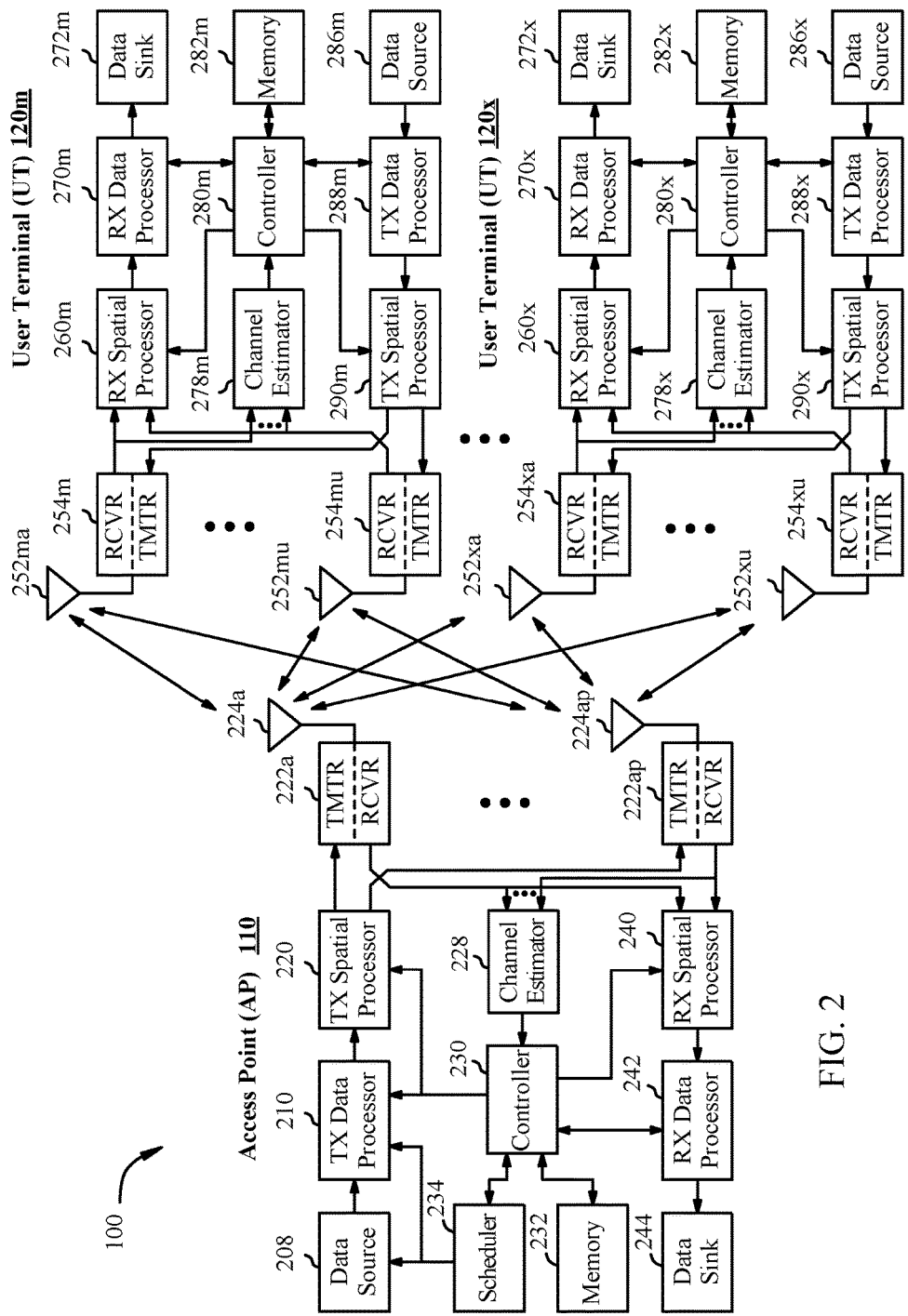
FIG. 2 is a block diagram of an example access point (AP) and user terminals, in accordance with certain aspects of the present disclosure.

FIG. 2 illustrates example components of the AP 110 and UT 120 illustrated in FIG. 1, which may be used to implement aspects of the present disclosure. One or more components of the AP 110 and UT 120 may be used to practice aspects of the present disclosure. For example, antenna 224, Tx/Rx 222, processors 210, 220, 240, 242, and/or controller 230 of the access point 110 may be used to perform the operations described herein and illustrated with reference to FIGS. 7 and 7A and FIGS. 8 and 8A. Similarly, antenna 252, Tx/Rx 254, processors 260, 270, 288, and 290, and/or controller 280 of the user terminal 120 may be used to perform the operations described herein and illustrated with reference to FIGS. 7 and 7A and FIGS. 8 and 8A.

FIG. 2 illustrates a block diagram of access point 110 two user terminals 120m and 120x in a MIMO system 100. The access point 110 is equipped with $N_t$ antennas 224a through 224ap. User terminal 120m is equipped with $N_{ut,m}$ antennas 252ma through 252mu, and user terminal 120x is equipped with $N_{ut}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a transmit (TX) data processor 288 receives traffic data from a data source 286 and control data from a controller 280. The controller 280 may be coupled with a memory 282. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

$N_{up}$ user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing. The controller 230 may be coupled with a memory 232.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides $N_{dn}$ downlink data symbol streams for the $N_{dn}$ user terminals. A TX spatial processor 220 performs spatial processing (such as a precoding or beamforming, as described in the present disclosure) on the $N_{dn}$ downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals. The decoded data for each user terminal may be provided to a data sink 272 for storage and/or a controller 280 for further processing.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, at access point 110, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal. Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

Figure 3:
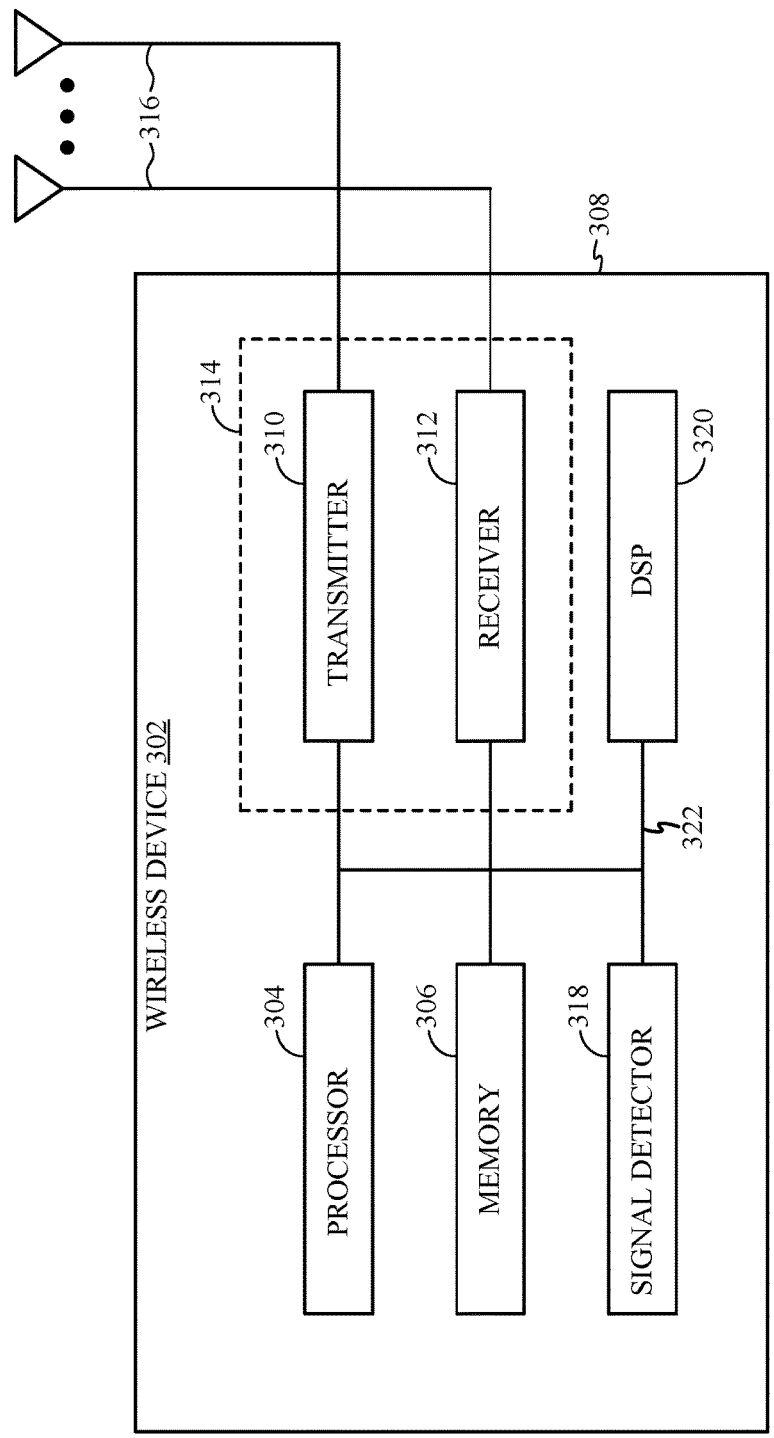
FIG. 3 is a block diagram of an example wireless device, in accordance with certain aspects of the present disclosure.

FIG. 3 illustrates various components that may be utilized in a wireless device 302 that may be employed within the MIMO system 100. The wireless device 302 is an example of a device that may be configured to implement the various methods described herein. For example, the wireless device may implement operations 500 and 700-900 illustrated in FIGS. 5 and 7-9, respectively. The wireless device 302 may be an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote node. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Figure 4:
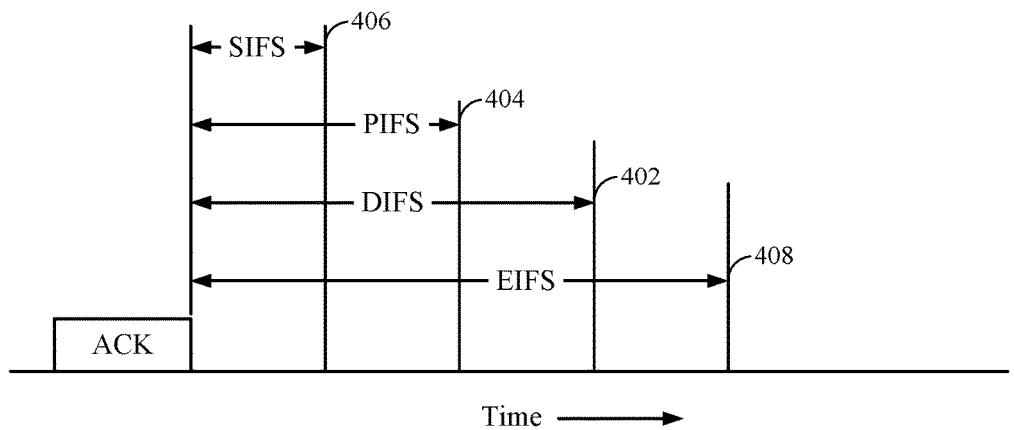
FIG. 4 illustrates example interframe spacings, in accordance with certain aspects of the present disclosure.

In networking using a shared medium, pauses may be required between network packets or frames. These pauses allow for coordinated use of the medium. FIG. 4 illustrates an example time sequence of 802.11 interframe spacing. In a contention based protocol for accessing a shared medium such as the DCF protocol in 802.11, a node senses the medium to determine whether another node is accessing the medium prior to transmitting. In sensing the status of the medium, the node looks to see if the medium is continuously idle for a particular duration, such as distributed interframe space (DIFS) duration 402. Where the medium is busy during the DIFS duration, the node may backoff for time period or duration and sense the medium again after the backoff time period. If the medium is idle for the DIFS duration, either prior to or after the backoff period, the node may transmit on the medium. A point coordination function (PCF) interframe space (PIFS) duration 404 defines a time period a PCF enabled node, such as an AP, waits, rather than a DIFS duration 402, before accessing the medium. This PIFS duration 404 may be shorter than the DIFS duration 402 to give priority to PCF enabled nodes priority access to the medium as compared to nodes waiting a DIFS period 402. A short interframe space (SIFS) duration 406 defines the amount of time a node has to process a received frame and respond with a response frame, such as an acknowledgement (ACK) frame. This SIFS duration 406 is shorter than DIFS duration 402 and PIFS duration 404 and has priority access to the medium.

After receiving a frame, a node attempts to decode the frame. In some cases, the medium itself may be noisy or unreliable, such as where the medium is a wireless medium. Where a node detects an occurrence of an error when processing the received frame, for example, in the PHY layer (such as where the PHY header contains a format violation, or the PSDU is not received properly) or MAC layer (such as an incorrect MAC FCS value), the node defers an extended interframe space (EIFS) period (e.g., duration) 408 rather than an DIFS duration 402 before accessing the medium. An EIFS duration 408 may be equal to transmission time of a regular short ACK frame at the lowest physical layer rate plus short interface SIFS duration 406 plus DIFS duration 402. Additionally, in some cases, EIFS duration 408 may be even longer. This allows another node which may have received and decoded the frame without detecting an error, time to respond to the frame. The EIFS duration 408 enables another node that successfully receives the frame to respond to the frame without interference from nodes that are not able to decode the frame.

Example EIFS Exemption Rules

As indicated above, aspects of the present disclosure provide techniques that allow a device determine whether the device, after detecting an error when processing a frame, may select a deferral period based, at least in part, on a determination of an intended recipient of the frame.

For example, according to certain aspects, where a node detecting an error is the intended receiver of the frame, waiting for the EIFS deferral period is unnecessary. Rather, the node may respond in accordance with the DIFS deferral period. That is, the EIFS period may be set to the DIFS period and after the DIFS period, the node may generate and output a frame intended to prompt a retransmission of the frame received with the detected error. The EIFS deferral protects the intended receiver from interference from a node detecting an error when processing a received frame. Where the node detecting the error while processing a received frame is the intended receiver, the EIFS deferral prevents the intended receiver (i.e., the node) from acknowledging the frame or requesting retransmission of the frame for the EIFS deferral period. Further, if a second receiver is able to receive the frame without error, that second receiver may only have to wait for the shorter DIFS deferral period before accessing the medium. Where the second receiver also detects an error when processing the received frame, then the medium is idled and both receivers must contend for access after the EIFS period.

A node detecting an error when processing a received frame may still be able to decode enough of the frame to determine the intended recipient of the frame. For example, PHY layer transmission may be sent at a different bitrate than the MAC layer and less subject to noise or interference in the transmission medium. As another example, a detected error may occur in the PSDU, such as a failed frame check sequence (FCS) check for the Media access control (MAC) protocol data unit (MPDU). However, receiving node may still be able to decode enough of the PHY portion of the frame and determine the intended receiver of the frame.

Figure 5:
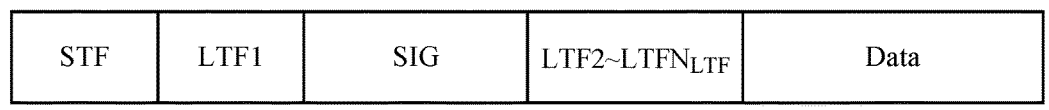
FIG. 5 illustrates an example frame format, in accordance with certain aspects of the present disclosure.

In accordance with certain aspects of the present disclosure, a receiver of a frame may be able to determine the intended receiver of a frame based on information included in a PHY header. For example, information contained in the physical layer convergence protocol (PLCP) protocol data unit (PPDU) may allow the intended receiver to be determined. FIG. 5 illustrates an example S1G PPDU frame format, in accordance with certain aspects of the present disclosure. A PPDU may contain one or more signal (SIG) fields, which may be in a preamble of a frame. Information may be carried in the one or more SIG fields, such as a value for a color field. For example, a high efficiency (HE) single user (SU) PPDU may contain a color field in a SIG-A field and a HE multi-user (MU) PPDU may contain identifiers in the SIG-B field. These identifiers may include a color field, a partial association identifier (AID) field, a partial transmitter AID (TAID) field, and/or an uplink/downlink (UL/DL) indication.

The color field may be used to assist a receiving node identify the BSS from which a received transmission originates. The value of the color field may be chosen by an AP after sensing the medium and associated with a particular BSS to which the AP belongs. This color field should be unique as possible and no AP within range of another AP should choose a color field already in use by the another AP.

This color field enables the receiving node to detect that the frame being received is not from the BSS with which the node is associated with. Where the node detects a color field value with which the node is not associated with, the node may cease the reception process. The color field may be 3-6 bits and allow for 8-63 possible color values.

In networks with centralized management and control, for example through a centralized controller, color values may be allocated to the AP's such that it is possible to guarantee that each BSS has a unique color value. However, for distributed management networks, it may not be possible to guarantee uniqueness as hidden node problems may still arise.

In accordance with certain aspects of the present disclosure, as the color value may not be a unique identifier, it may be advantageous to look to other information in the frame to help determine the intended recipient of the frame. Examples of this other information may include, but are not limited to, a partial AID, a partial TAID, an UL/DL frame indication, or the MAC header. Where a receiver is able to receive and decode the receiver address (RA) field in the MAC header, the receiver would have a unique identifier of the intended recipient to determine whether the receiver is the intended recipient. However, as indicated above, the MAC layer may be more subject to interference than the PHY layer.

Figure 6:
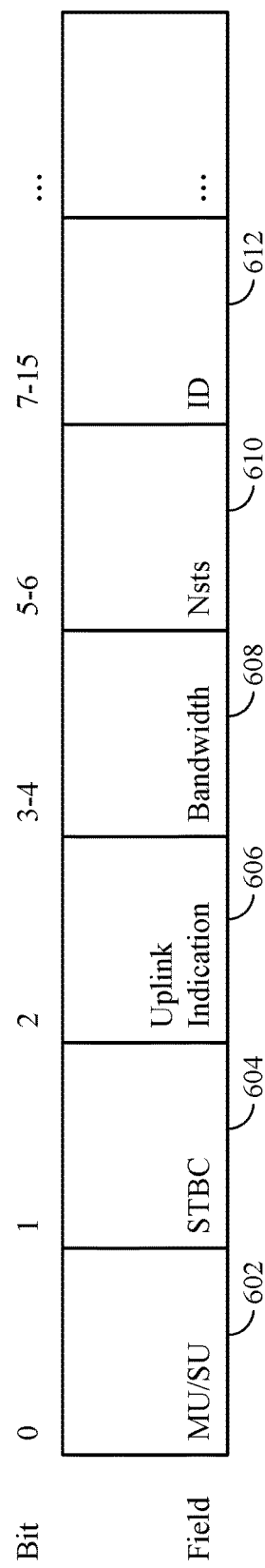
FIG. 6 illustrates example frame fields, in accordance with certain aspects of the present disclosure.

FIG. 6 illustrates an example SIG-A field of a S1G SU PPDU, in accordance with certain aspects of the present disclosure. The SIG-A field may contain, for example, a MU/SU field 602 indicating MU/SU mode, a STBC field 604 indicating whether spatial streams have space time block coding, an uplink indication 606, a bandwidth field 608, the number of space time streams (Nsts) 610, and an ID field 612. The ID field 612 may contain a partial AID and or a color field. A partial AID may be a non-unique identifier based on a BSSID which identifies the intended receiver of the PPDU. Where the uplink frame indication 606 is not present or set to 1 (i.e. uplink frame to the AP), the ID field 612 may contain a 9 bit partial AID. The partial AID in such cases may be a partial BSSID. Where the uplink frame indication is set to 0 (i.e. downlink frame), bits 7-9 may contain the color field and bits 10-15 may contain a partial AID. The partial AID in such cases may be a XORed version of the partial AID of the STA and the BSSID.

In accordance with certain aspects of the present disclosure, the color value may be combined with the partial AID to determine the intended recipient of a frame. As discussed above, the partial AID identifies the intended receiver of the frame and the color provides information related to the BSS associated with the frame. Where a first apparatus detects an error when processing a frame and determines that the frame's color value matches the color value of a BSS with which the first apparatus is associated with, and the partial AID value of the frame matches the first apparatus's partial AID, it is safe for the first apparatus to set the deferral period to a DIFS period instead of a EIFS period. This is because with an appropriate length for the color and partial AID fields, it is very unlikely that a second apparatus will have both the same color and partial AID fields as the first apparatus. Further, for a response by both the first and second apparatuses to collide due to deferral period selection, the first station must not receive the frame correctly, the second apparatus receives the frame correctly to generate the response, and the second apparatus is not within transmission range of the first apparatus and thus incapable of detecting the preamble of the response by the first apparatus. Under these circumstances, the second apparatus's transmission may cause the sender of the frame to fail to receive the response frame from the first apparatus.

In accordance with certain aspects of the present disclosure, the color value may be combined with a partial TAID to determine the intended recipient of a frame. In the uplink, the partial TAID may be an XOR'ed version of a partial AID of the node and a BSSID. In the downlink, the partial TAID may be the partial BSSID. As the partial TAID identifies a transmitter of the PPDU, the partial TAID may be less likely to uniquely identify an intended recipient of a frame than the partial AID as an AP may transmit to multiple STAs. However, where the number of receivers is low, for example where each color value is associated with two apparatuses, the partial TAID may be used with the color value to determine the intended recipient of the frame.

In accordance with certain aspects of the present disclosure, the color value may be combined with an UL/DL indication to determine the intended recipient of a frame. The indication of UL/DL may be used in conjunction with the color value, for example, to indicate when an intended recipient is an AP.

In accordance with certain aspects of the present disclosure, a bit value may also be provided, for example, in a SIG field in the PHY header, containing an indication of whether or not a receiving apparatus should select a first or second deferral period, regardless of the target recipient of the frame. That is, for a particular bit value, when the receiving apparatus detects an error in a received frame, the receiving apparatus always waits the full EIFS period.

Aspects of the present disclosure may be applied in various wireless systems that rely on carrier sense mechanisms. For example, the techniques presented herein may be applied in certain systems, such as IEEE 802.11ax (also known as high efficiency wireless (HEW) or high efficiency wireless local area network (WLAN)), that use physical (PHY) layer and medium access control (MAC) layer signaling for requests and responses. As used herein, a response may refer to a response frame that is transmitted in response to a request frame.

A response may include an acknowledgment (ACK) frames, clear-to-send (CTS) frames, negative ACK (NACK) frames, etc. Lost responses may be undesirable. For example, a lost ACK may lead to re-transmission of successful packets which may reduce the transmitter's throughput and/or cause unnecessary interference. Having reliable responses is desirable, particularly, in the case of dense networks.

Figure 7:
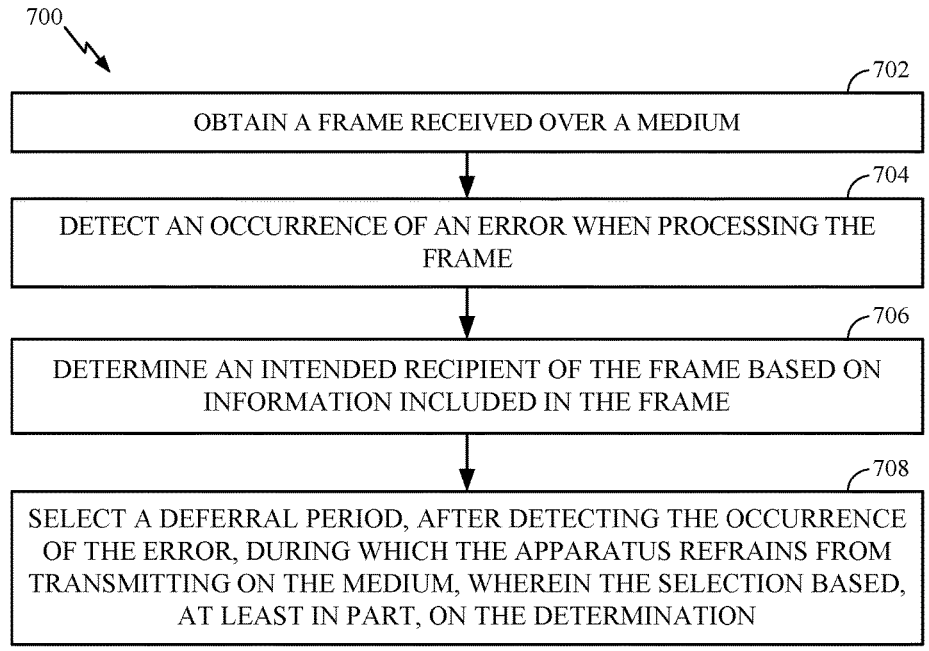
FIG. 7 is a flow diagram illustrating example operations 700 for wireless communications by an apparatus, in accordance with certain aspects of the present disclosure.
Figure 7A:
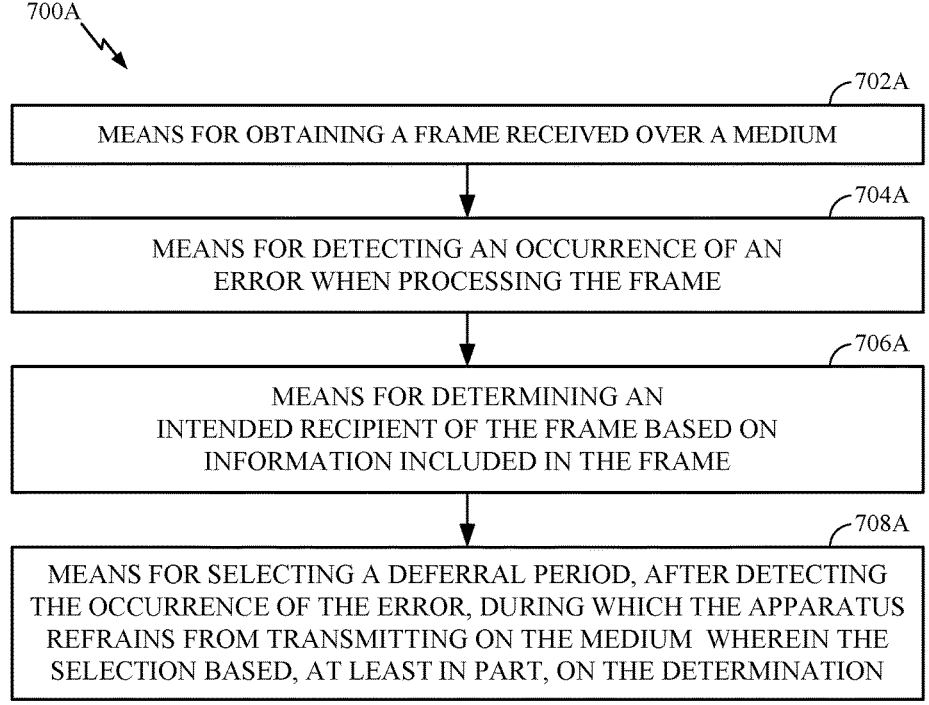
FIG. 7A illustrates example means capable of performing the operations shown in FIG. 7.

FIG. 7 is a flow diagram illustrating example operations 700 for wireless communications by an apparatus, in accordance with certain aspects of the present disclosure. The operations may begin, at 702, by obtaining a frame received over a medium. At 704, detecting an occurrence of an error when processing the frame. At 706, determining an intended recipient of the frame based on information included in the frame is made. At 708, selecting a deferral period, after detecting the occurrence of the error, during which the apparatus refrains from transmitting on the medium based, at least in part, on the determination is made.

Figure 8:
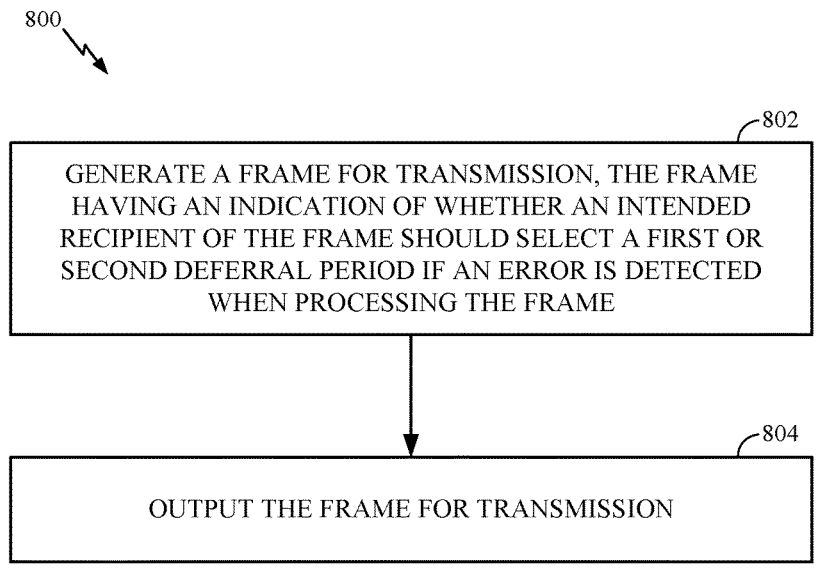
FIG. 8 is a flow diagram illustrating example operations 800 for wireless communications by an apparatus, in accordance with certain aspects of the present disclosure.
Figure 8A:
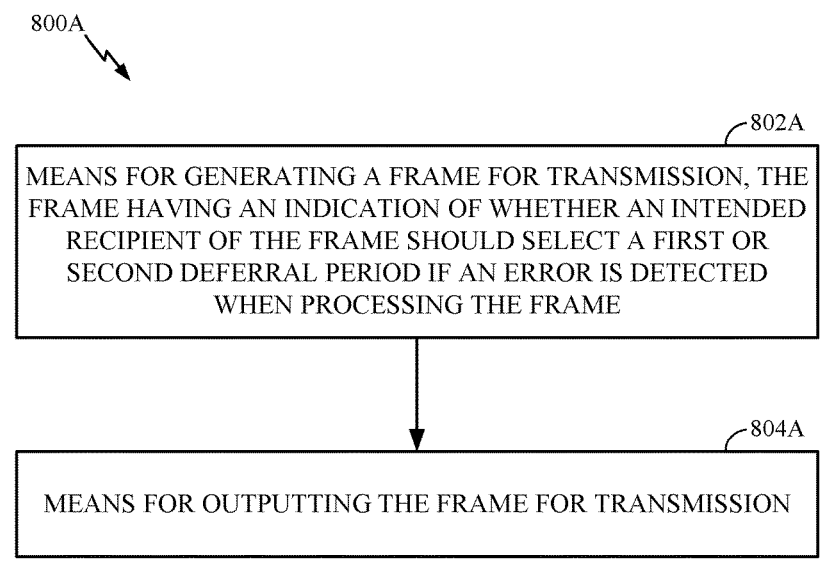
FIG. 8A illustrates example means capable of performing the operations shown in FIG. 8.

FIG. 8 is a flow diagram illustrating example operations 800 for wireless communications by an apparatus, in accordance with certain aspects of the present disclosure. The operations may begin, at 802, by generating a frame for transmission, the frame having an indication of whether an intended recipient of the frame should select a first or second deferral period if an error is detected when processing the frame. At 804, outputting the frame for transmission.

According to aspects of the present disclosure, the first deferral period may correspond to a DIFS or PIFS period, while the second deferral period may correspond to an EIFS period. Where the frame has an indication that the intended recipient of the frame should select the second deferral period, if the receiving apparatus detects an error in a received frame, the receiving apparatus will wait the full EIFS period regardless of whether the receiving apparatus is the intended receiver. The indication may also indicate that the second deferral period applies to a transmit opportunity (TXOP) duration for a sequence of one or more frames exchanged between a transmitter and a receiver.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

In some cases, rather than actually transmitting a frame, a device may have an interface to output a frame for transmission. For example, a processor may output a frame, via a bus interface, to an RF front end for transmission. Similarly, rather than actually receiving a frame, a device may have an interface to obtain a frame received from another device. For example, a processor may obtain (or receive) a frame, via a bus interface, from an RF front end for transmission.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 700 and 800 illustrated in FIGS. 7 and 8, respectively, correspond to means 700A and 800A illustrated in FIGS. 7A and 8A, respectively.

For example, means for obtaining and means for receiving may be a receiver (e.g., the receiver unit of transceiver 254) and/or an antenna(s) 252 of the user terminal 120 illustrated in FIG. 2 or the receiver (e.g., the receiver unit of transceiver 222) and/or antenna(s) 224 of access point 110 illustrated in FIG. 2. Means for transmitting and means for outputting may be a transmitter (e.g., the transmitter unit of transceiver 254) and/or an antenna(s) 252 of the user terminal 120 illustrated in FIG. 2 or the transmitter (e.g., the transmitter unit of transceiver 222) and/or antenna(s) 224 of access point 110 illustrated in FIG. 2.

Means for processing, means for generating, means for including, means for deferring, means for determining, means for performing, means for detecting, means for selecting, and means for sensing may comprise a processing system, which may include one or more processors, such as the RX data processor 270, the TX data processor 288, and/or the controller 280 of the user terminal 120 illustrated in FIG. 2 or the TX data processor 210, RX data processor 242, and/or the controller 230 of the access point 110 illustrated in FIG. 2.

According to certain aspects, such means may be implemented by processing systems configured to perform the corresponding functions by implementing various algorithms (e.g., in hardware or by executing software instructions) described above. For example, an algorithm for obtaining a frame received over a medium, detecting an occurrence of an error when processing the frame, determining an intended recipient of the frame based on information included in the frame, and selecting a deferral period, after detecting the occurrence of the error, during which the apparatus refrains from transmitting on the medium wherein the selection is based, at least in part, on the determination. In another example, an algorithm for generating a frame for transmission, the frame having an indication of whether an intended recipient of the frame should select a first or second deferral period if an error is detected when processing the frame, and outputting the frame for transmission.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for obtaining a frame received over a medium, detecting an occurrence of an error when processing the frame, determining an intended recipient of the frame based on information included in the frame, and selecting a deferral period, after detecting the occurrence of the error, during which the apparatus refrains from transmitting on the medium, wherein the selection is based, at least in part, on the determination. In another example, instructions for generating a frame for transmission, the frame having an indication of whether an intended recipient of the frame should select a first or second deferral period if an error is detected when processing the frame, and outputting the frame for transmission Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communications, comprising:
a first interface configured to obtain a frame received over a medium;
a processing system configured to:
detect an occurrence of an error when processing the frame;
determine an intended recipient of the frame based on information included in the frame; and
after detecting the occurrence of the error, select a deferral period based, at least in part, on the determination, wherein the selection comprises selecting a first deferral period if the determination is that the apparatus is not the intended recipient of the frame, wherein the first deferral period is greater than a second deferral period; and a second interface configured to refrain from outputting a frame for transmission on the medium during the selected deferral period.

2. The apparatus of claim 1, wherein the information comprises a value associated with a basic service set (BSS) to which the apparatus belongs.

3. The apparatus of claim 1, wherein the information comprises a partial association identifier (AID).

4. The apparatus of claim 1, wherein the information is carried in a signal field of a preamble of the frame.

5. The apparatus of claim 4, wherein the information is carried at least in part in a color field in the signal field.

6. The apparatus of claim 1, wherein the second deferral period comprises a distributed interframe space (DIFS) or a point coordination function (PCF) interframe space (PIFS) period.

7. The apparatus of claim 1, wherein the first deferral period comprises an extended interframe space (EIFS) period.

8. The apparatus of claim 1, wherein:
the processing system is configured to generate another frame intended to prompt a retransmission of the frame received with the error; and
the second interface is configured to output the generated other frame for transmission.

9. The apparatus of claim 1, wherein the information comprises an identifier of a device that transmitted the frame.

10. The apparatus of claim 1, wherein the information comprises an indication of whether the frame is an uplink frame or a downlink frame.

11. The apparatus of claim 1, wherein the information is included in a media access control (MAC) header of the frame.

12. The apparatus of claim 1, wherein the processing system is configured to determine, based on an indication in the frame, whether the selection of the deferral period is to be based, at least in part, on the determined intended recipient of the frame.

13. The apparatus of claim 12, wherein the indication is included in a PHY header of the frame.

14. The apparatus of claim 1, wherein:
the information includes a first indication that the frame is for an uplink or downlink and a second indication of a color in a preamble of the frame; and
the processing system is configured to determine the intended recipient of the frame based on the first indication and the second indication.

15. A method for wireless communications by an apparatus, comprising:
obtaining a frame received over a medium;
detecting an occurrence of an error when processing the frame;
determining an intended recipient of the frame based on information included in the frame; and
after detecting the occurrence of the error, selecting a deferral period based, at least in part, on the determination, wherein the selection comprises selecting a first deferral period if the determination is that the apparatus is not the intended recipient of the frame, wherein the first deferral period is greater than a second deferral period; and
refraining from outputting a frame for transmission on the medium during the selected deferral period.

16. The method of claim 15, wherein the information comprises a value associated with a basic service set (BSS) to which the apparatus belongs.

17. method of claim 15, wherein the information comprises a partial association identifier (AID).

18. The method of claim 15, wherein the information is carried in a signal field of a preamble of the frame.

19. The method of claim 18, wherein the information is carried at least in part in a color field in the signal field.

20. The method of claim 15, wherein the information comprises an indication of whether the frame is an uplink frame or a downlink frame.

21. An apparatus for wireless communications, comprising:
means for obtaining a frame received over a medium;
means for detecting an occurrence of an error when processing the frame;
means for determining an intended recipient of the frame based on information included in the frame; and
means for selecting a deferral period based, at least in part, on the determination after detecting the occurrence of the error, wherein the means for selecting selects a first deferral period if the determination is that the apparatus is not the intended recipient of the frame, wherein the first deferral period is greater than a second deferral period; and
means for refraining from outputting a frame for transmission on the medium during the selected deferral period.

22. The apparatus of claim 21, wherein the information comprises a value associated with a basic service set (BSS) to which the apparatus belongs.

23. The apparatus of claim 21, wherein the information comprises a partial association identifier (AID).

24. The apparatus of claim 21, wherein the information is carried in a signal field of a preamble of the frame.

25. The apparatus of claim 24, wherein the information is carried at least in part in a color field in the signal field.

26. A non-transitory computer readable medium having instructions stored thereon that when executed by one or more processors, cause an apparatus to:
receive a frame over a medium;
detect an occurrence of an error when processing the frame;
determine an intended recipient of the frame based on information included in the frame; and
after detecting the occurrence of the error, select a deferral period based, at least in part, on the determination, wherein the selection comprises selecting a first deferral period if the determination is that the apparatus is not the intended recipient of the frame, wherein the first deferral period is greater than a second deferral period; and
refrain from transmitting a frame on the medium during the selected deferral period.

27. The non-transitory computer readable medium of claim 26, wherein the information comprises a value associated with a basic service set (BSS) to which the apparatus belongs.

28. The non-transitory computer readable medium of claim 26, wherein the information comprises a partial association identifier (AID).

29. The non-transitory computer readable medium of claim 26, wherein the information is carried in a signal field of a preamble of the frame.

30. The non-transitory computer readable medium of claim 29, wherein the information is carried at least in part in a color field in the signal field.

* * * * *